United States Patent
Isogai et al.

(10) Patent No.: US 9,618,001 B2
(45) Date of Patent: Apr. 11, 2017

(54) TURBOCHARGER

(71) Applicant: OTICS Corporation, Nishio (JP)

(72) Inventors: Tomoyuki Isogai, Aichi (JP); Tetsuya Niwa, Aichi (JP)

(73) Assignee: OTICS Corporation, Nishio (JP)

( * ) Notice: Subject to any disclaimer, the term of this patent is extended or adjusted under 35 U.S.C. 154(b) by 403 days.

(21) Appl. No.: 14/260,859

(22) Filed: Apr. 24, 2014

(65) Prior Publication Data

US 2014/0322003 A1    Oct. 30, 2014

(30) Foreign Application Priority Data

Apr. 26, 2013 (JP) ................................. 2013-094184

(51) Int. Cl.
| | | |
|---|---|---|
| *F04D 17/10* | (2006.01) | |
| *F02C 6/12* | (2006.01) | |
| *F04D 29/44* | (2006.01) | |
| *F04D 29/70* | (2006.01) | |

(52) U.S. Cl.
CPC ............ *F04D 17/10* (2013.01); *F02C 6/12* (2013.01); *F04D 29/441* (2013.01); *F04D 29/701* (2013.01); *F05D 2260/601* (2013.01); *F05D 2260/607* (2013.01); *Y02T 50/675* (2013.01)

(58) Field of Classification Search
CPC ...... F04D 17/10; F04D 29/701; F04D 29/441; F02C 6/12; Y02T 50/675; F05D 2260/601; F05D 2260/607
USPC .............................. 415/1, 119; 60/605.2, 606
See application file for complete search history.

(56) References Cited

U.S. PATENT DOCUMENTS

| | | | |
|---|---|---|---|
| 3,362,629 A | 1/1968 | Papapanu | |
| 4,250,711 A | 2/1981 | Zehnder | |
| 5,327,725 A | 7/1994 | Mitsubori | |
| 5,406,796 A | 4/1995 | Hiereth et al. | |
| 5,607,010 A * | 3/1997 | Schonfeld | F02B 47/08 165/51 |
| 6,601,672 B2 * | 8/2003 | Liu | F04D 29/4213 181/213 |

(Continued)

FOREIGN PATENT DOCUMENTS

| | | |
|---|---|---|
| AT | 507450 A2 | 5/2010 |
| JP | 2002-180841 | 6/2002 |

(Continued)

OTHER PUBLICATIONS

Extended European Search Report issued on Aug. 14, 2014 in the corresponding European Application No. 14165656.1.

(Continued)

*Primary Examiner* — Hoang Nguyen

(74) *Attorney, Agent, or Firm* — Oblon, McClelland, Maier & Neustadt, L.L.P.

(57) ABSTRACT

A turbocharger 1 includes a compressor housing 2 and a bearing housing 3. The compressor housing 2 has a shroud surface 221 and a diffuser surface 222. The bearing housing 3 has an opposite surface 311 facing the diffuser surface 222. An adhesion preventing part 4 is provided on at least one of the diffuser surface 222 and the opposite surface 311. The turbocharger 1 is configured so that compressed air spouts out from the adhesion preventing part 4 to the diffuser passage 15 by an ejector effect caused when compressed air passes through the diffuser passage 15.

5 Claims, 7 Drawing Sheets

(56) References Cited

U.S. PATENT DOCUMENTS

| | | | | |
|---|---|---|---|---|
| 6,669,436 B2* | 12/2003 | Liu | ...................... | F04D 29/665 |
| | | | | 181/286 |
| 7,043,914 B2* | 5/2006 | Ishikawa | ................ | F02M 26/07 |
| | | | | 60/278 |
| 7,722,316 B2 | 5/2010 | Scarinci et al. | | |
| 2007/0175216 A1* | 8/2007 | Kobayashi | ............ | F01D 17/165 |
| | | | | 60/605.2 |
| 2010/0034634 A1 | 2/2010 | Scarinci et al. | | |
| 2011/0175025 A1* | 7/2011 | Schall | ................... | F01D 17/105 |
| | | | | 252/182.33 |
| 2014/0112762 A1 | 4/2014 | Isogai | | |

FOREIGN PATENT DOCUMENTS

| | | |
|---|---|---|
| JP | 2010-151032 A | 7/2010 |
| JP | 2010-151034 A | 7/2010 |
| WO | WO 2008/005382 A1 | 1/2008 |

OTHER PUBLICATIONS

Combined Chinese Office Action and Search Report issued Dec. 25, 2015 in Patent Application No. 201410169524.3 (with English Translation and English Translation of Categories of Cited Documents).

U.S. Appl. No. 14/724,977, filed May 29, 2015, Isogai.

Office Action issued on Jul. 26, 2016 in Japanese Patent Application No. 2013-094184 (with unedited computer generated English language translation).

* cited by examiner

TURBOCHARGER

CROSS-REFERENCE

This application claims priority to Japanese patent application no. 2013-094184 filed on Apr. 26, 2013, the contents of which are entirely incorporated herein by reference.

BACKGROUND OF THE INVENTION

Field of the Invention

The present invention relates to a turbocharger including a compressor housing and a bearing housing.

Description of the Related Art

A turbocharger mounted in automobiles and the like is configured so as to compress sucked air in a compressor and then to discharge compressed air toward an internal combustion engine (see Patent Document 1).

Specifically, the turbocharger includes a compressor housing having internally an air flow path in which an impeller is arranged and a bearing housing rotatably supporting a rotor shaft of which the impeller is fixed on one end. The air flow path has an air intake port for sucking air toward the impeller and a discharge scroll chamber into which compressed air discharged from the impeller flows.

The compressor housing has a shroud surface opposite to the impeller and a diffuser surface extending from the shroud surface toward the discharge scroll chamber. The bearing housing forms a diffuser passage between the bearing housing itself and the diffuser surface of the compressor housing.

The turbocharger is configured so that compressed air discharged from the impeller passes through the diffuser passage and flows into the discharge scroll chamber, and further is discharged from the discharge scroll chamber to the internal combustion engine side.

Patent Document

Patent Document 1: JP-A-2002-180841

SUMMARY OF THE INVENTION

For example, some internal combustion engines include a blow-by gas circulation device (hereinafter referred to as PCV) which circulates blow-by gas (mainly uncombusted gas) generated in a crankcase into an air intake passage to clean the inside of the crankcase or head cover. In this case, the oil (oil mist) contained in the blow-by gas sometimes flows out from PCV to the air intake passage on the upstream side of the compressor in the turbocharger.

At this time, when the air pressure at an outlet of the compressor is high, the outlet air temperature is also high, so that the oil which has flown out from PCV is sometimes accumulated as a deposit on the diffuser surface of the compressor housing, surface of the bearing housing opposite thereto and the like by concentration of the oil and viscosity increase of the oil due to evaporation. Then, the accumulated deposit narrows the diffuser passage, thereby causing the deterioration in performance of the turbocharger, so that the output of the internal combustion engine is likely to be lowered.

Conventionally, the air temperature at the outlet of the compressor was suppressed to some extent in order to prevent the accumulation of a deposit in the diffuser passage as described above. Therefore, it was impossible to sufficiently exert the performance of the turbocharger and also to sufficiently improve the output of the internal combustion engine.

The present invention has been made in light of such circumstances, and aims at providing a turbocharger which can prevent the adhesion of a deposit in a diffuser passage.

One aspect of the present invention resides in a turbocharger including a compressor housing having internally an air flow path in which an impeller is arranged, and a bearing housing rotatably supporting a rotor shaft on one end of which the impeller is fixed, wherein the air flow path has an air intake port for sucking air toward the impeller and a discharge scroll chamber formed in the circumferential direction on the outer circumferential side of the impeller to guide compressed air discharged from the impeller to the outside;

the compressor housing has a shroud surface opposite to the impeller and a diffuser surface extending from the shroud surface toward the discharge scroll chamber;

the bearing housing has an opposite surface facing the diffuser surface of the compressor housing to form a diffuser passage between the opposite surface and the diffuser surface;

an adhesion preventing part for preventing the adhesion of a deposit is provided on at least one of the diffuser surface of the compressor housing and the opposite surface of the bearing housing;

the adhesion preventing part has a surface forming part having many fine through holes which open to the side of the diffuser passage and an air tank part covered with the surface forming part from the side of the diffuser passage and configured so as to be in communication with the air flow path on the downstream side of the diffuser passage so that a part of compressed air is supplied; and the turbocharger is configured so that compressed air supplied to the air tank part spouts out to the diffuser passage through the through holes by an ejector effect caused when compressed air passes through the diffuser passage.

In the turbocharger, the adhesion preventing part is provided in at least one of the diffuser surface of the compressor housing and the opposite surface of the bearing housing. The adhesion preventing part has the surface forming part having many fine through holes which open to the diffuser passage side and the air tank part in which a part of compressed air is supplied on the side opposite to the diffuser passage of the surface forming part. Compressed air passes through the diffuser passage, thereby causing ejector effect (entrainment effect) in the adhesion preventing part, so that compressed air within the air tank part spouts out to the diffuser passage via the many fine through holes in the surface forming part. Thus, a distance between the deposit, which has come flying to the adhesion preventing part, and the surface on the diffuser passage side of the adhesion preventing part can be ensured, thereby making it possible to suppress the intermolecular force between the deposit and the surface on the diffuser passage side of the adhesion preventing part. Therefore, the deposit which has come flying to the adhesion preventing part would be blown off by supplied air (compressed air) flowing through the diffuser passage. Consequently, the deposit is prevented from being adhered onto the surface on the diffuser passage side of the adhesion preventing part.

Further, a part of compressed air discharged from the impeller is utilized as a gas to be spouted out to the diffuser passage via the through holes in the adhesion preventing part. Such compressed air is somewhat lower in pressure than supplied air (compressed air) passing through the diffuser passage, but the ejector effect obtained by supplied air can prevent compressed air within the diffuser passage from flowing back via the through holes to the air tank part side, especially without pressurization by means of a pressurizing pump or provision of a back-flow valve.

When the temperature at the outlet of the compressor is relatively low, liquid oil mist sometimes comes flying to the diffuser passage. However, the liquid oil mist is repelled by compressed air spouted out to the diffuser passage from the adhesion preventing part and also blown off by supplied air. Therefore, it is possible to prevent the oil mist from being accumulated in the diffuser passage as a deposit.

As described above, the present invention can provide a turbocharger which can prevent the adhesion of a deposit in the diffuser passage.

DESCRIPTION OF THE PREFERRED EMBODIMENTS

Figure 1:
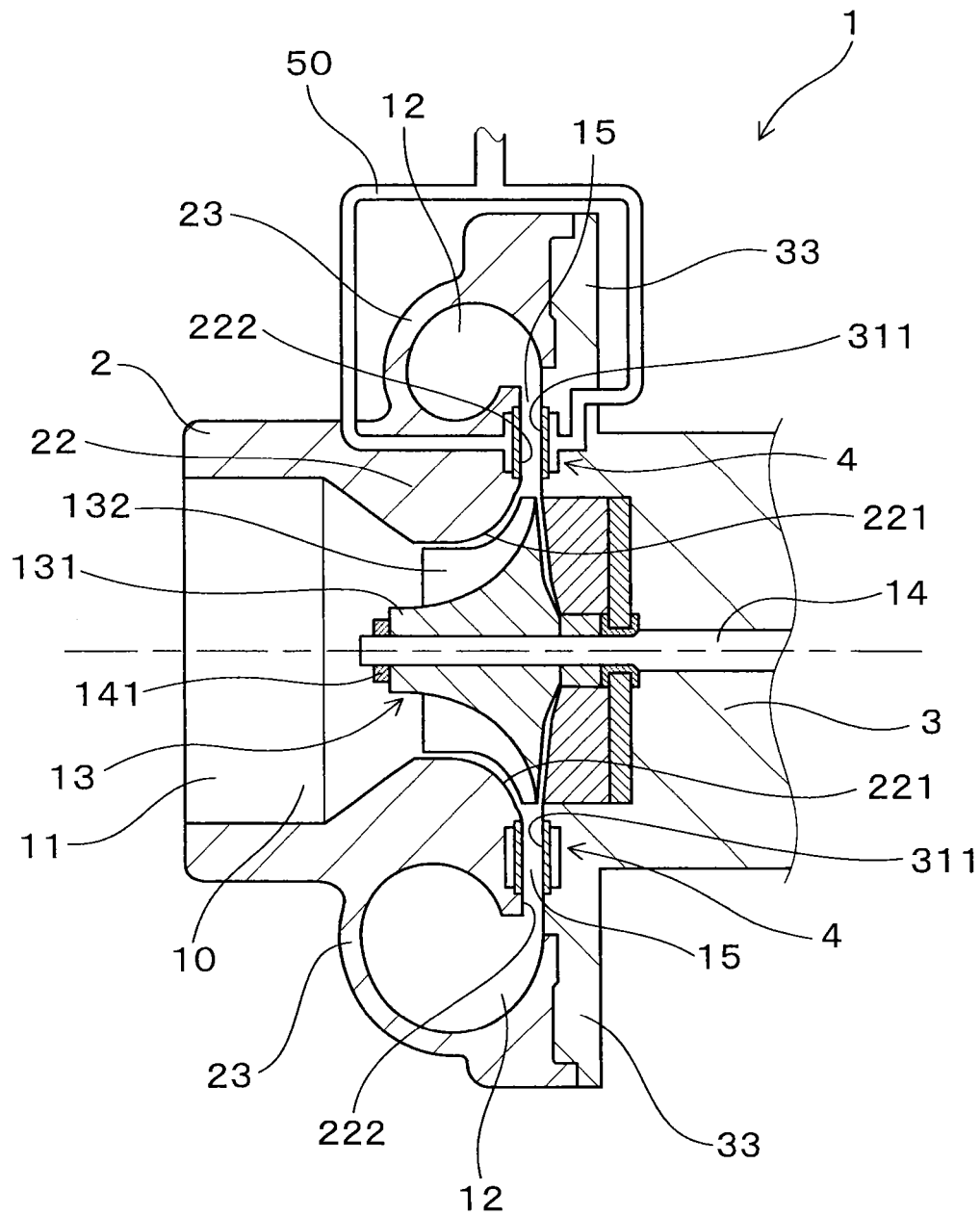
FIG. 1 This is a cross-sectional explanatory view showing a turbocharger in Example 1.

The adhesion preventing part is preferably provided in a circular shape over the entire circumferential direction in at least one of the diffuser surface of the compressor housing and the opposite surface of the bearing housing. In this case, it is possible to prevent the variation in deposit adhesion preventing effect in the diffuser passage over the entire circumferential direction.

The adhesion preventing part is preferably formed in a region having a length not less than half of the full length of the diffuser passage in the radial direction in at least one of the diffuser surface of the compressor housing and the opposite surface of the bearing housing. In this case, it is possible to effectively prevent the adhesion of a deposit in the diffuser passage. Here, the full length of the diffuser passage is a length, in the radial direction, of a region where the diffuser surface and the opposite surface are arranged in parallel with one another. In the meantime, the adhesion preventing part can also be formed over the full length of the diffuser passage in the radial direction.

The surface forming part can be designed to be made of a porous body. In this case, it is possible to easily form the many fine through holes. Also, the surface forming part can be formed inexpensively by using the porous body.

For example, a porous resin, a metal, ceramic, a glass fiber or carbon graphite, or a material equivalent thereto (such as a material wrapped with a resin film, a material obtained by stacking resin papers, or a material obtained by knitting a resin thread) can be used as the porous body.

Also, the surface forming part can be designed to be made of a material other than porous materials. The surface forming part can be formed, for example, by perforating a metallic or resin plate in the thickness direction to provide many fine through holes. Such perforation of a metal or resin plate can be carried out by means of a drill, laser, electric discharge machining or the like.

In the turbocharger, each of the fine through holes can be formed so that a hole forming direction directed from the opening part on the side of the air tank part to the opening part on the side of the diffuser passage is inclined to the downstream side of the diffuser passage. In this case, the respective through holes would be formed toward the downstream side of the diffuser passage. Therefore, the compressed air flowing direction at the through holes is directed from the upstream side to the downstream side of the diffuser passage, as is the case with the compressed air flowing direction in the diffuser passage. As a result, compressed air within the air tank part would smoothly flow via the through holes into the diffuser passage. Then, the effect of entrainment of compressed air in the air tank part via the through holes, caused by compressed air flowing through the diffuser passage, is improved. This improves the deposit adhesion preventing effect in the adhesion preventing part.

The many fine through holes may be each formed linearly from the opening part on the air tank part side toward the opening part on the diffuser passage side, or may be formed in a curve shape while curving from the one opening part toward the other opening part. Also, the through holes may be branched on the way from the one opening part to the other opening part. All of the many fine through holes may be formed in the same shape, or the shape of some of the through holes may be different from that of the other through holes.

In the turbocharger, the through holes can be formed along a virtual curve in the diffuser passage, the virtual curve being curved in such a manner that the closer the curve comes to the downstream side of the diffuser passage from a starting point, the more distant the curve is in a direction opposite to a rotating direction of the impeller, with respect to such a virtual straight line passing the starting point that an angle formed with a tangent line at the outer edge of the impeller from the starting point coincides with a backward angle of the impeller.

Compressed air discharged from the impeller within the compressor housing flows, in the diffuser passage, in such a direction that the backward angle of the impeller becomes gradually smaller as compressed air advances to the downstream of the diffuser passage. Compressed air discharged from the impeller would flow along the virtual curve. Hence, the many fine through holes would be aligned along a direction where compressed air flows. Thus, compressed air within the air tank part smoothly spouts out to the diffuser passage via the through holes and smoothly flows in the compressed air flowing direction in the diffuser passage. As a result, the deposit adhesion preventing effect in the adhesion preventing part is improved.

The term "backward angle" refers to an angle (sharp angle side) formed between a direction of forming the respective outer edge parts of a plurality of blades possessed by the impeller and a tangential direction of the impeller in the outer edge parts, on the outer edge of the impeller (namely, outlet for the air compressed by the impeller).

In the turbocharger, a bypass passage is preferably connected to the air flow path on the downstream side of an outlet port discharging compressed air guided by the discharge scroll chamber, and preferably configured so that compressed air is supplied to the air tank part via the bypass passage. Compressed air discharged from the impeller flows to the downstream side while whirling spirally within the discharge scroll chamber and at an area immediately behind the discharge scroll chamber. Therefore, if the bypass passage is provided within the discharge scroll chamber or at an area immediately behind the discharge scroll chamber to supply compressed air to the air tank part, the oil mist and deposit scattering within the air flow path would easily flow into the bypass passage together with the flow of compressed air whirling spirally. The oil mist and deposit intruded into the bypass passage is likely to cause clogging of the through holes in the adhesion preventing part or to be accumulated on the inner wall of the bypass passage, thereby reducing the effect of preventing the adhesion of a deposit in the adhesion preventing part.

However, spirally whirling compressed air is rectified as it flows through the discharge scroll chamber to the downstream side, and thus is in a rectified state to some extent on the downstream side of an outlet port. Therefore, the bypass passage is connected to the air flow path on the downstream side of the outlet port to supply compressed air rectified to some extent to the air tank part, so that the flow of the oil mist and deposit into the bypass passage is suppressed, thereby making it possible to prevent the reduction in the effect of preventing adhesion of a deposit in the adhesion preventing part.

In the turbocharger, an air flowing port of the bypass passage in a connection part of the bypass passage and the air flow path preferably opens in a direction where compressed air flows in the air flow path on the downstream side of the outlet port. In this case, the flow of the oil mist and deposit scattering along the compressed air flowing direction into the bypass passage can be prevented.

Also, the adhesion preventing part can be designed so as to be provided both in the diffuser surface of the compressor housing and in the opposite surface of the bearing housing. In this case, the adhesion of a deposit can be effectively prevent both on the diffuser surface of the compressor housing and on the opposite surface of the bearing housing.

Example 1

An Example of the turbocharger will be explained by use of FIG. 1 to FIG. 6.

Figure 2:
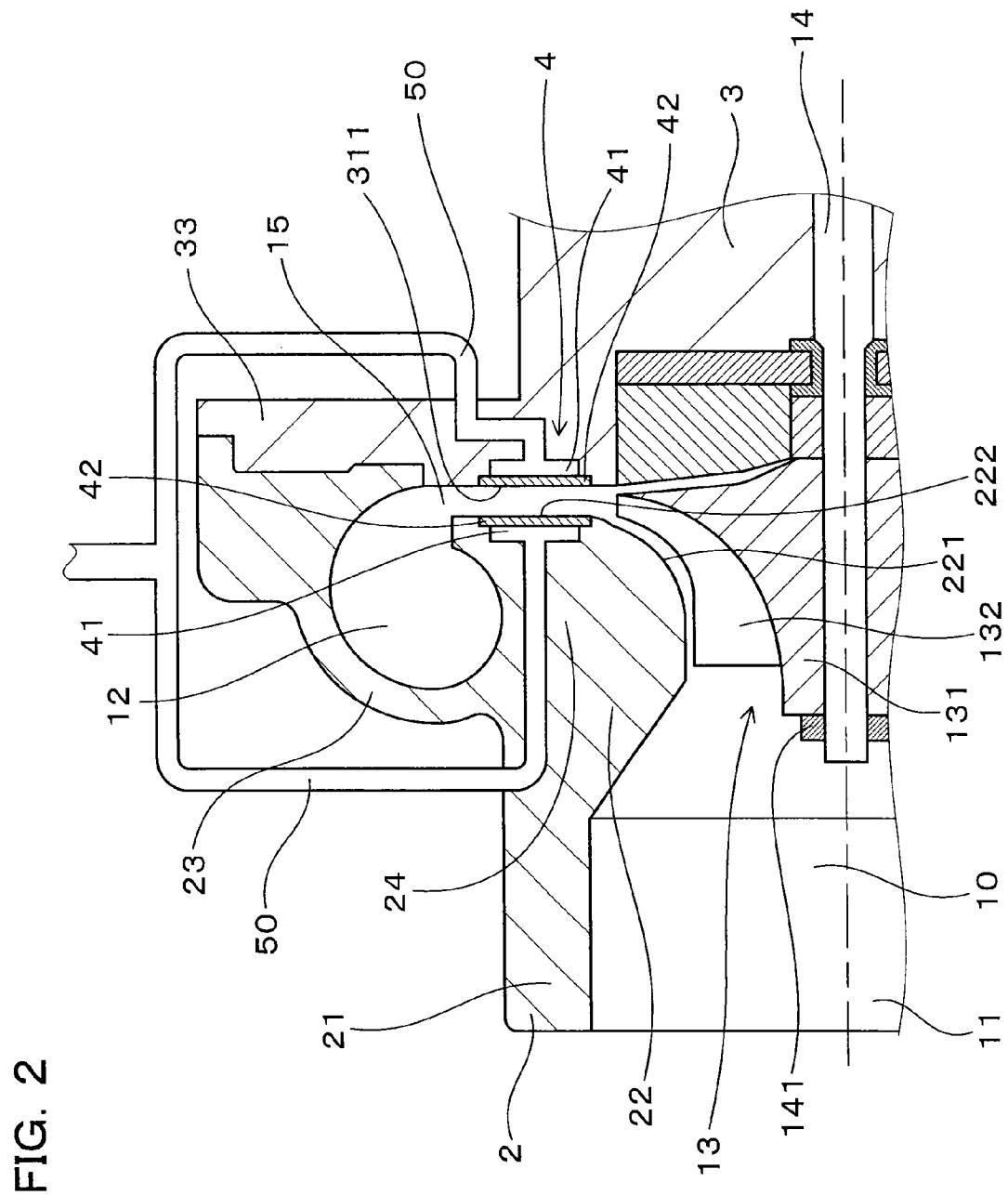
FIG. 2 This is an enlarged cross-sectional explanatory view showing the turbocharger in Example 1.

A turbocharger 1 of this example includes, as shown in FIG. 1 and FIG. 2, a compressor housing 2 having internally an air flow path 10 in which an impeller 13 is arranged and a bearing housing 3 rotatably supporting a rotor shaft 14 of which the impeller 13 is fixed on one end.

The air flow path 10 has an air intake port 11 for sucking air toward the impeller 13 and a discharge scroll chamber 12 formed in the circumferential direction on the outer circumferential side of the impeller 13 to guide compressed air discharged from the impeller 13 to the outside.

As shown in FIG. 1 and FIG. 2, the compressor housing 2 has a shroud surface 221 opposite to the impeller 13 and a diffuser surface 222 extending from the shroud surface 221 toward the discharge scroll chamber 12.

The bearing housing 3 has an opposite surface 311 facing the diffuser surface 222 of the compressor housing 2 and forming a diffuser passage 15 between the opposite surface 311 itself and the diffuser surface 222.

Figure 4:
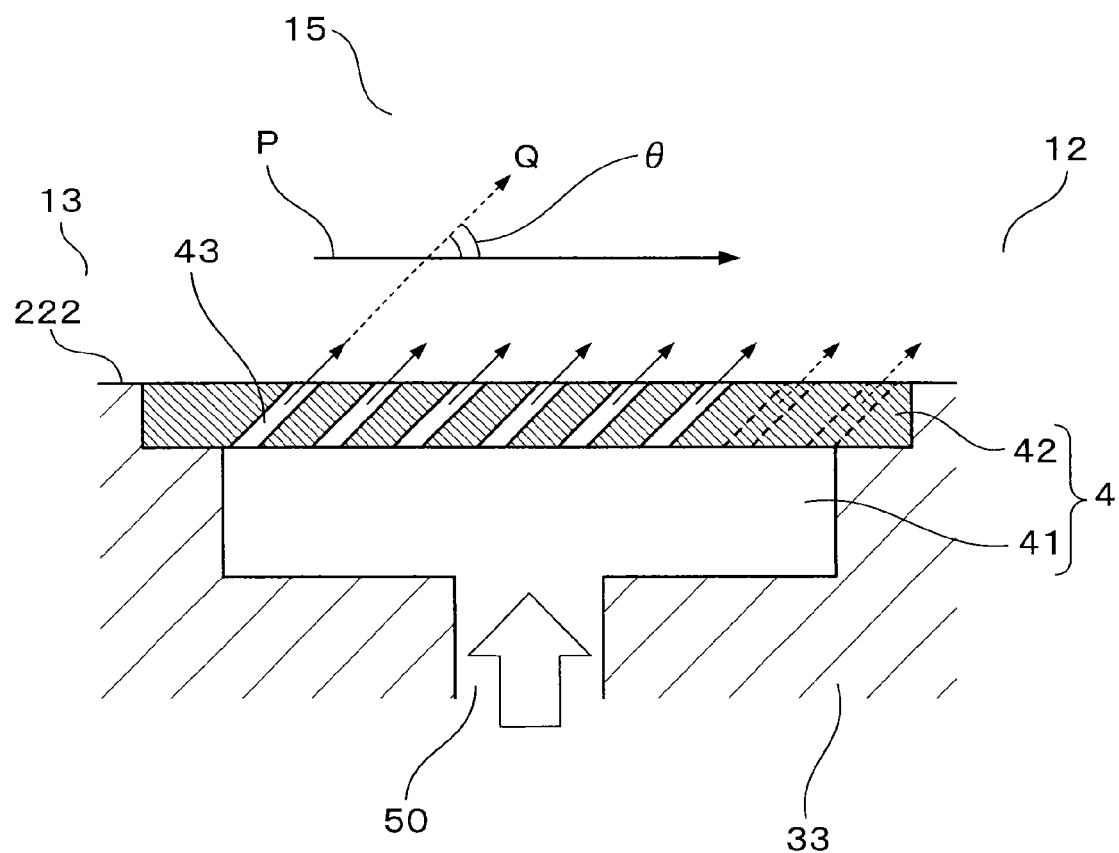
FIG. 4 This is an enlarged cross-sectional explanatory view showing an adhesion preventing part in Example 1.

An adhesion preventing part 4 for preventing the adhesion of a deposit is provided both on the diffuser surface 222 of the compressor housing 2 and on the opposite surface 311 of the bearing housing 3. As shown in FIG. 4, the adhesion preventing part 4 includes a surface forming part 42 and an air tank part 41. The surface forming part 42 has many fine through holes 43 which open to the side of the diffuser passage 15.

Figure 3:
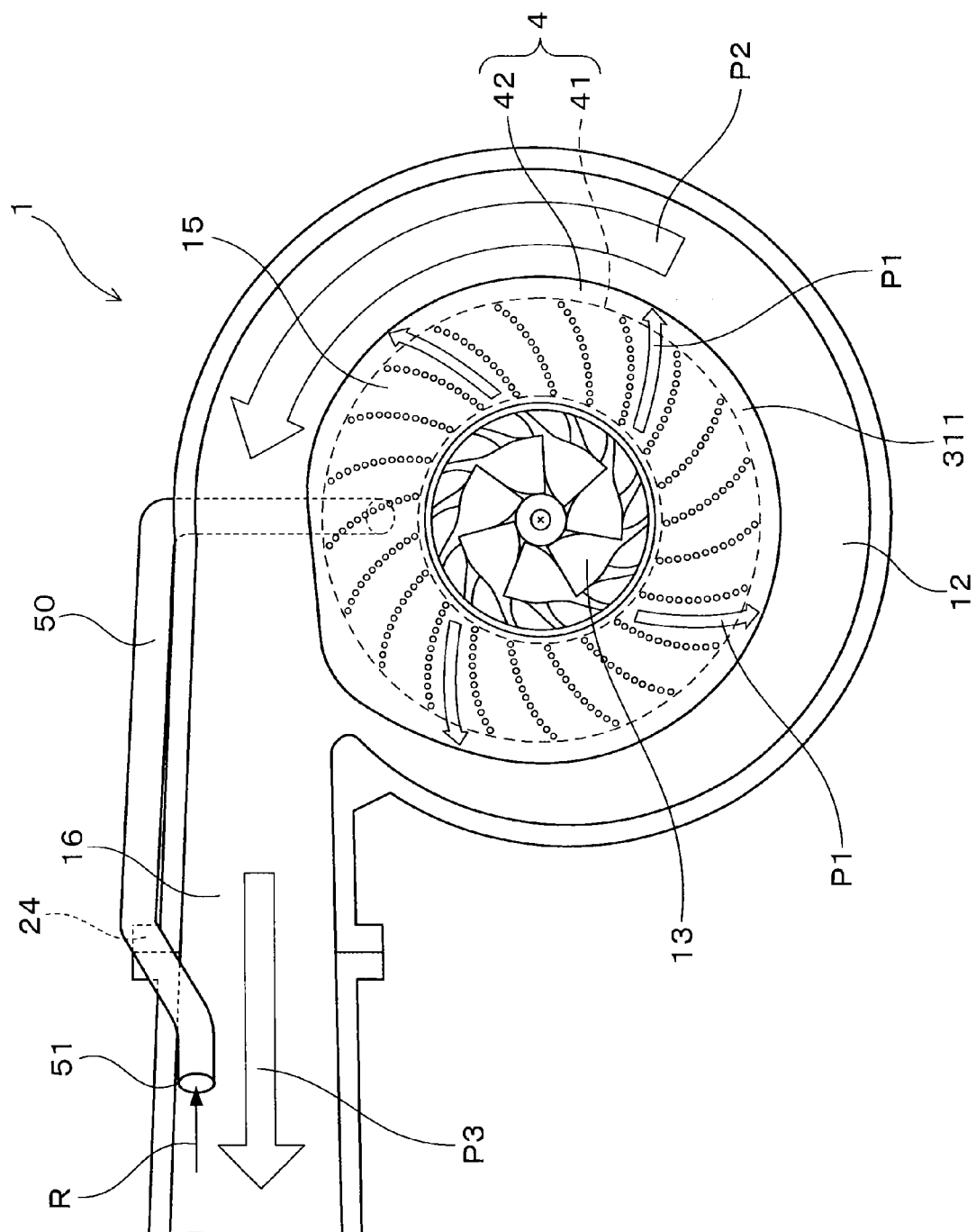
FIG. 3 This is a top explanatory view showing a diffuser passage, a discharge scroll chamber and an impeller in Example 1.

The air tank part 41 is covered with the surface forming part 42 from the side of the diffuser passage 15. The air tank part 41 is configured so as to be in communication with the air flow path on the downstream side of the diffuser passage 15 (in this example, downstream side of an outlet port 16) as shown in FIG. 3 so that a part of compressed air is supplied.

Figure 6:
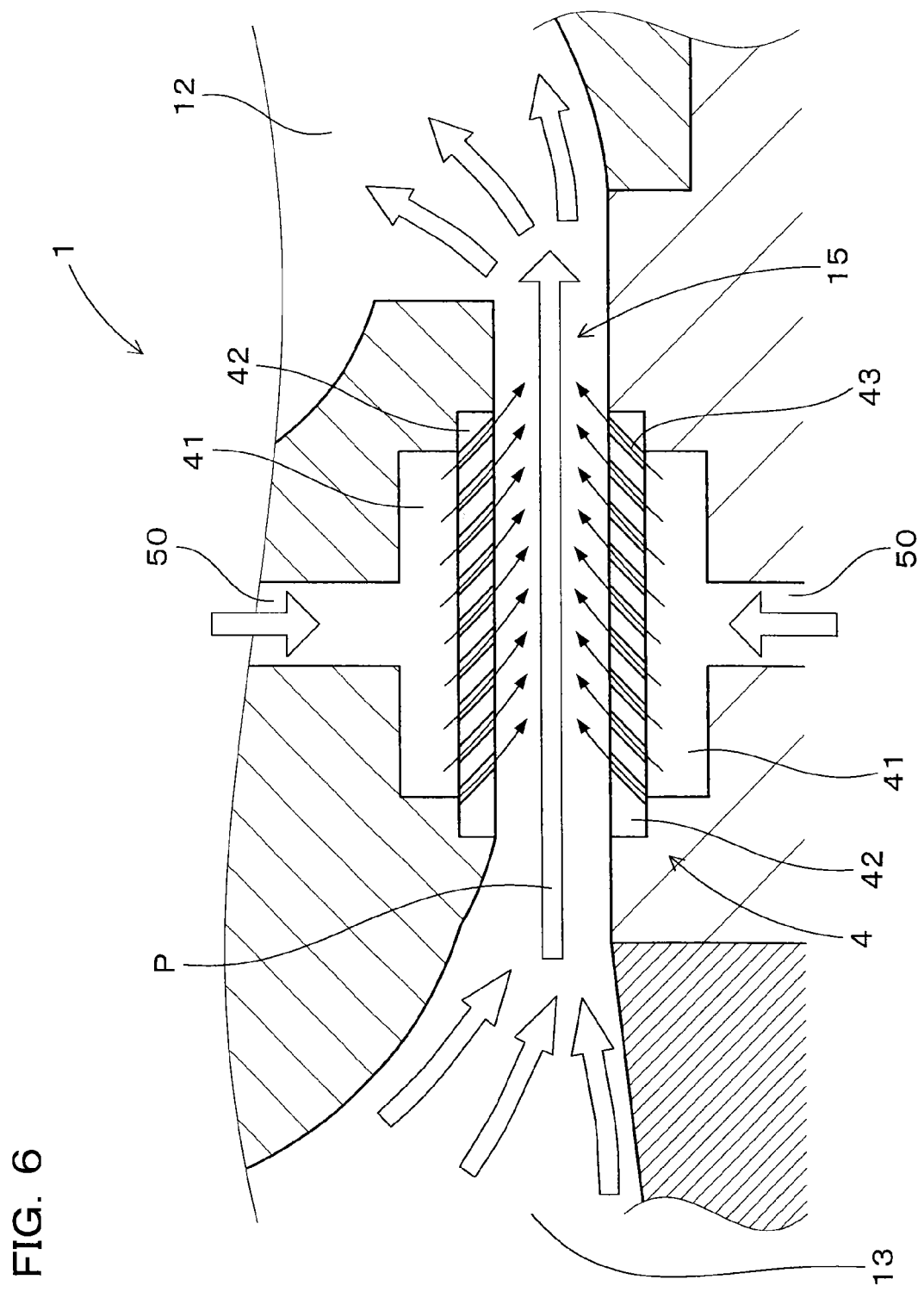
FIG. 6 This is an enlarged cross-sectional explanatory view showing the state where ejector effect has been caused in Example 1.

As shown in FIG. 6, such a configuration is employed that compressed air supplied to the air tank part 41 spouts out to the diffuser passage 15 via the through holes 43 by the ejector effect caused when compressed air passes through the diffuser passage 15.

The configuration of the turbocharger 1 of this example will be explained in detail below.

The turbocharger 1 can be used by connecting to an internal combustion engine having PCV.

As shown in FIG. 1, the turbocharger 1 is configured so as to rotate a turbine by exhaust gas discharged from the internal combustion engine of an automobile and the like, to compress sucked air in the compressor by use of the rotative force and to feed compressed air to the internal combustion engine. Thus, the turbocharger 1 has a turbine housing (not shown) on the side opposite to the compressor housing 2 which constitutes the outer shell of the compressor in the axial direction.

Inside the turbine housing, an exhaust gas flow path, in which a turbine impeller is arranged, is formed. The turbine impeller is fixed on the rotor shaft 14. Namely, the impeller 13 of the compressor and the turbine impeller are coupled to each other by the rotor shaft 14. Thus, the impeller 13 of the compressor is configured so as to rotate with the rotation of the turbine impeller.

As shown in FIG. 1, the compressor housing 2 has a cylindrical air intake port forming part 21 which forms the air intake port 11, a shroud part 22 which forms the shroud surface 221 and the diffuser surface 222, and a discharge scroll chamber forming part 23 which forms the discharge scroll chamber 12. The shroud surface 221 is formed in an annular shape so as to face the opposite surface 311 of the bearing housing 3. Also, the shroud surface 221 forms the diffuser passage 15 between the shroud surface 221 itself and the opposite surface 311 of the bearing housing 3. In the diffuser passage 15, compressed air compressed by the impeller 13 as described below flows from the side of the upstream impeller 13 to the side of the downstream discharge scroll chamber 12, as shown by an arrow P in FIG. 4.

As shown by the arrow P1 in FIG. 3, compressed air which has flown to the side of the discharge scroll chamber 12 from the side of the impeller 13 flows down to the downstream outlet port 16 as shown by the arrow P2 while whirling spirally within the discharge scroll chamber 12. Thereafter, compressed air is discharged from the outlet port 16 to the outside (internal combustion engine side) as shown by the arrow P3.

Figure 5:
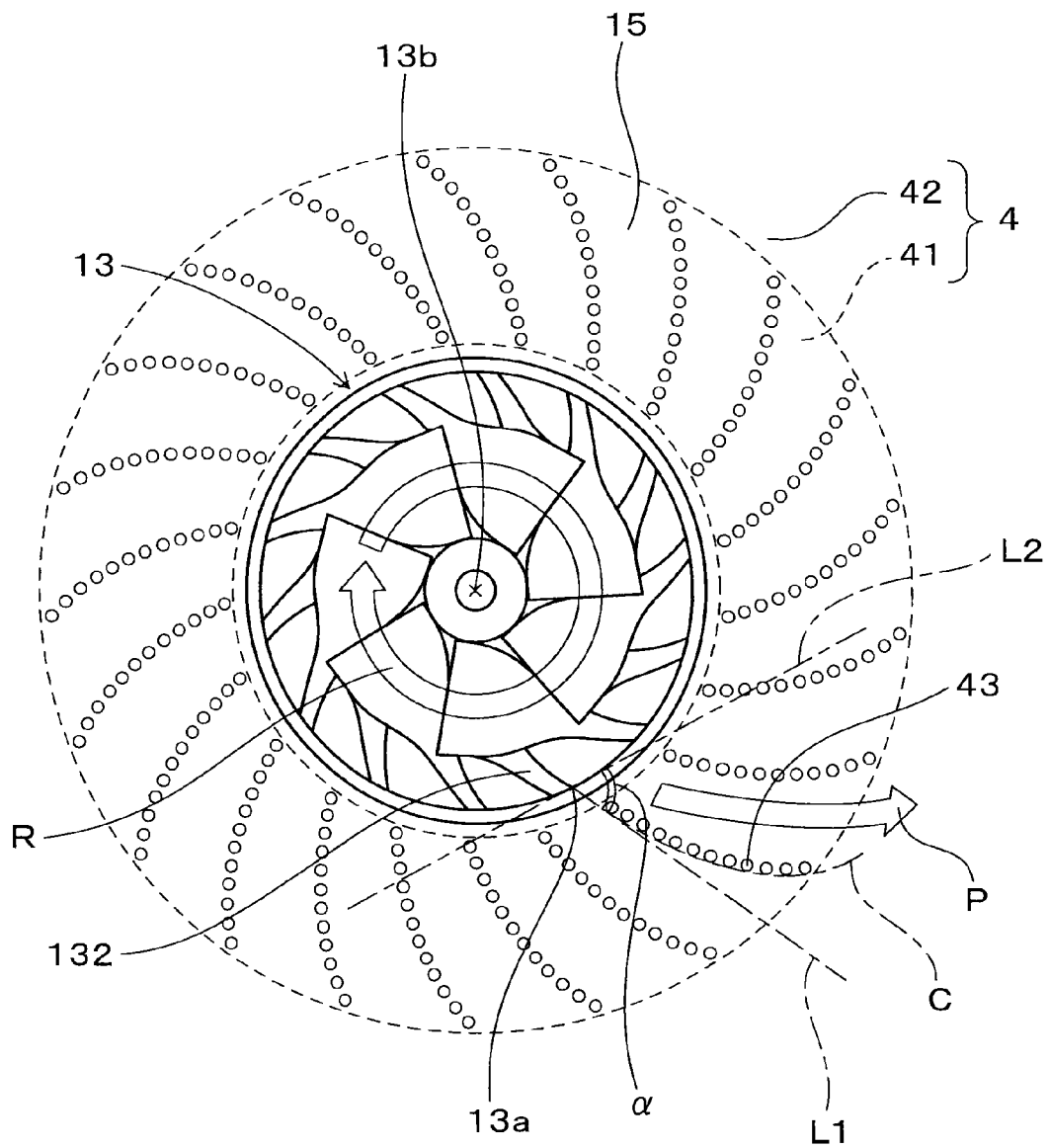
FIG. 5 This is a top explanatory view showing an opposite surface which forms the diffuser passage and the impeller.

Also, the impeller 13 is arranged on the inner circumferential side of the shroud part 22 of the compressor housing 2, as shown in FIG. 2. The impeller 13 has a hub 131 fixed on the rotor shaft 14 by an axial end nut 141 and a plurality of blades 132 protruding from the outer circumferential face of the hub 131 and arranged side by side in the circumferential direction. The plurality of blades 132 are arranged opposite to the shroud surface 221 of the compressor housing 2. As shown in FIG. 5, the blades 132 are inclined to a virtual straight line L2 along the tangential (outlet tangential) direction at an outer edge 13a of the impeller 13, and an angle (backward angle) α between the blades 132 at the outer edge 13a of the impeller 13 and the virtual straight line L2 is about 60 degrees.

As shown in FIG. 1 and FIG. 2, the bearing housing 3 rotatably supporting the rotor shaft 14 is arranged between the compressor housing 2 and the turbine housing. An approximately disk-shaped flange part 33 is provided on one end side in the axial direction of the bearing housing 3. The opposite surface 311 facing the diffuser surface 222 of the compressor housing 2 is formed annularly on the face on the compressor side in the flange part 33.

As shown in FIG. 1 and FIG. 2, the adhesion preventing part 4 is provided in the compressor housing 2 and bearing housing 3, respectively. The respective adhesion preventing parts 4 are provided circularly over the entire circumferential direction on the diffuser surface 222 of the compressor housing 2 and the opposite surface 311 of the bearing housing 3. Also, the adhesion preventing parts 4 are formed in a region having a length not less than half of the full length of the diffuser passage 15 in the radial direction on the diffuser surface 222 and the opposite surface 311.

As shown in FIG. 2, the adhesion preventing part 4 has the air tank part 41 and the surface forming part 42. The air tank part 41 is an annular space formed by covering, with the surface forming part 42, the diffuser passage 15 side of a groove part formed annularly in the diffuser surface 222 of the compressor housing 2 and the opposite surface 311 of the bearing housing 3. As shown in FIG. 2, the bypass passage 50 is connected to the air tank part 41. As shown in FIG. 3, the bypass passage 50 is attached to a compressor housing outlet flange part 24 and connected to an air flow path positioned on the downstream side of the outlet port 16. Thus, the air tank part 41 is configured so as to be in communication with the air flow path on the downstream side of the diffuser passage 15 (in this example, downstream side of the outlet port 16) via the bypass passage 50 so that a part of compressed air is supplied.

As shown in FIG. 3, an air flowing port 51 of the bypass passage 50 opens in a compressed air flowing direction P3 in the air flow path, and a direction R where compressed air flowing through the air flowing port 51 flows is opposite to the direction P3.

As shown in FIG. 3 and FIG. 5, the surface forming part 42 is an annular (toroidal) plate-like member. For example, aluminum and iron can be used as the material for the surface forming part 42.

Many fine through holes 43 which open to the side of the diffuser passage 15 are formed in the surface forming part 42. The through holes 43 penetrate from the air tank part 41 to the diffuser passage 15, as shown in FIG. 4. The diameter of the respective through holes 43 can be defined, for example, within the range of from about 0.5 μm to about 50 μm. Thus, it is possible to effectively prevent compressed air from flowing back via the through holes 43 while moderately suppressing the pressure loss when compressed air passes through the through holes 43. In this example, the diameter of the respective through holes 43 is about 1.0 μm.

As shown in FIG. 4, each fine through holes 43 are formed so that a hole forming direction Q directed from the opening part on the side of the air tank part 41 to the opening part on the side of the diffuser passage 15 is inclined to the downstream side of the diffuser passage 15 (the side of the discharge scroll chamber 12). Namely, an angle θ formed between the direction Q where the through holes 43 are formed and a compressed air flowing direction P in the diffuser passage 15 is less than 90 degrees. In this example, the angle θ is about 40 degrees. In the meantime, the flowing direction P is parallel to the diffuser surface 222.

As shown in FIG. 5, the many fine through holes 43 are formed along a virtual curve C in the diffuser passage 15. The virtual curve C is curved in such a manner that the closer the curve comes to the downstream side of the diffuser passage 15 (side of the discharge scroll chamber 12) from a starting point (outer edge 13a), the more distant the curve is in a direction opposite to the rotating direction R of the impeller 13, with respect to such a virtual straight line L1 that an angle formed with a tangent line (virtual straight line L2) at the outer edge 13a of the impeller 13 from the starting point coincides with a backward angle α of the impeller 13. The through holes 43 are formed at respective positions where the virtual curve C in FIG. 5 is rotated around an axial core 13b of the impeller 13 at intervals of a predetermined angle.

The density of each through holes 43 is not especially limited, and may be appropriately changed within a range wherein necessary adhesion preventing effect is obtained. For example, the through holes 43 may be provided in such a manner that the proportion of the area occupied by the opening parts of the through holes 43 on the surface of the diffuser passage 15 ranges from about 20% to about 50%.

Next, the function and effect of the turbocharger 1 of this example will be explained.

In the turbocharger 1 of this example, the diffuser surface 222 and opposite surface 311 are each provided with the adhesion preventing part 4. The adhesion preventing part 4 has the surface forming part 42 having the many fine through holes 43 which open to the side of the diffuser passage 15 and the air tank part 41 to which a part of compressed air has been supplied on the side opposite to the diffuser passage 15 of the surface forming part 42.

As shown in FIG. 6, the air flow path of the diffuser passage 15 is narrower than the air flow path on the side of the impeller 13 and the air flow path on the side of the discharge scroll chamber 12. Therefore, compressed air passes through the diffuser passage 15 from the side of the impeller 13, thereby causing ejector effect in the adhesion preventing part 4. Specifically, compressed air within the air tank part 41 spouts out to the diffuser passage 15 via the many fine through holes 43 of the surface forming part 42. Thus, a distance between the deposit which has come flying to the adhesion preventing part 4 and the surface on the side of the diffuser passage 15 of the adhesion preventing part 4 can be ensured, thereby making it possible to suppress the intermolecular force between the deposit and the surface on the side of the diffuser passage 15 of the adhesion preventing part 4. Therefore, the deposit which has come flying to the adhesion preventing part 4 would be blown off by supplied air (compressed air) flowing through the diffuser passage 15. Consequently, the deposit is prevented from being adhered onto the surface on the side of the diffuser passage 15 of the adhesion preventing part 4.

Further, a part of compressed air discharged from the impeller 13 is utilized as a gas to be spouted out to the diffuser passage 15 via the through holes 43 in the adhesion preventing part 4. Such compressed air is somewhat lower in pressure than compressed air in the diffuser passage 15, but the ejector effect obtained by supplied air can prevent compressed air within the diffuser passage 15 from flowing back via the through holes 43 to the air tank part 41 side, especially without pressurization by means of a pressurizing pump or provision of a back-flow valve.

When the temperature at the outlet of the compressor 2 is relatively low, the liquid oil mist sometimes comes flying to the diffuser passage 15, but is repelled by compressed air spouting out from the adhesion preventing part 4 to the diffuser passage 15 and blown off by supplied air. Therefore, it is possible to prevent the accumulation of the oil mist as a deposit in the diffuser passage 15.

In the turbocharger 1, the many fine through holes 43 are each formed so that the hole forming direction Q directed from the opening part on the side of the air tank part 41 toward the opening part on the side of the diffuser passage 15 is inclined to the downstream side of the diffuser passage 15 (side of the discharge scroll chamber 12). Thus, since the respective through holes 43 are formed toward the downstream side of the diffuser passage 15 (side of the discharge scroll chamber 12), the compressed air flowing direction at the through holes 43 is similar to the compressed air flowing direction in the diffuser passage 15 (side of the discharge scroll chamber 12 from the side of the impeller 13). As a result, compressed air within the air tank part 41 would flow smoothly into the diffuser passage 15. Then, the effect of entrainment of compressed air in the air tank part 41 via the through holes 43, which is caused by compressed air flowing in the P direction through the diffuser passage 15, is improved, resulting in an improved deposit adhesion preventing effect in the adhesion preventing part 4.

In this example, the angle θ between the direction Q where the respective through holes 43 are formed and the direction P where compressed air flows is about 40 degrees. Thus, as compared with the case where the angle θ is close to 90 degrees, the effect of entrainment of compressed air in the air tank part 41 via the through holes 43 is sufficiently exerted. Also, the length of the respective through holes 43 is short as compared with the case where the angle θ is close to 0 degree, namely, the direction Q is approximately parallel to the direction P where compressed air flows in the diffuser passage 15, whereby the pressure loss at the through holes 43 is appropriately suppressed. Also, the number of the through holes 43 can be sufficiently ensured, and the through holes 43 are easily formed.

In the turbocharger 1, the through holes 43 are formed along the virtual curve C. The virtual curve C is curved in such a manner that the closer the curve comes to the downstream side of the diffuser passage 15 from a starting point (outer edge 13a), the more distant the curve is in a direction opposite to the rotating direction R of the impeller 13, with respect to such a virtual straight line L1 such that an angle formed with a tangent line (virtual straight line L2) at the outer edge 13a of the impeller 13 from the starting point coincides with a backward angle α of the impeller 13. As shown in FIG. 5, compressed air discharged from the impeller 13 flows, in the diffuser passage 15, in such a direction that the backward angle α of the impeller 13 becomes gradually smaller as compressed air advances to the downstream side of the diffuser passage 15 (side of the discharge scroll chamber 12). Namely, compressed air discharged from the impeller 13 would flow along the virtual curve C. Hence, the many fine through holes 43 would be aligned along a direction P where compressed air flows. Thus, compressed air within the air tank part 41 smoothly spouts out into the diffuser passage 15 via the through holes 43 and smoothly flows in the direction P where compressed air flows in the diffuser passage 15. As a result, the deposit adhesion preventing effect in the adhesion preventing part 4 is improved.

Also, the turbocharger 1 is configured in such a manner that the bypass passage 50 is connected to an air flow path positioned on the downstream side of the outlet port 16 from which compressed air guided by the discharge scroll chamber 12 is derived and also that compressed air is supplied to the air tank part 41 via the bypass passage 50. Thus, compressed air is rectified to some extent at a site where the bypass passage 50 is connected, thereby suppressing the flow of the oil mist and deposit into the bypass passage 50 and making it possible to prevent reduction of the deposit adhesion preventing effect in the adhesion preventing part 4.

Also, in the turbocharger 1, the air flowing port 51 of the bypass passage 50 opens in the direction P3 where compressed air flows in the air flow path on the downstream side of the outlet port 16, thereby making it possible to prevent the flow of the oil mist and deposit scattering along the compressed air flowing direction P3 into the bypass passage 50.

The adhesion preventing part 4 is provided both on the diffuser surface 222 and on the opposite surface 311, thereby making it possible to effectively prevent the adhesion of a deposit both onto the diffuser surface 222 and onto the opposite surface 311.

The adhesion preventing part 4 is provided in a circular shape over the entire circumferential direction on the diffuser surface 222 and the opposite surface 311, thereby making it possible to prevent the variation in deposit adhesion preventing effect in the diffuser passage 15 over the entire circumferential direction.

The adhesion preventing part 4 is also formed in a region having a length not less than half of the full length of the diffuser passage 15 in the radial direction on the diffuser surface 222 and the opposite surface 311, thereby making it possible to effectively prevent the adhesion of a deposit in the diffuser passage 15.

In this example, the adhesion preventing part 4 is provided both on the diffuser surface 222 and on the opposite surface 311, but is not limited thereto, and may be provided on only either one of the diffuser surface 222 and the opposite surface 311. In this case, the above-described function and effect are obtained except those obtained by providing the adhesion preventing part 4 both on the faces.

Also in this example, the bypass passage 50 may be connected to the air flow path downstream of the outlet port 16, but is not limited thereto, and is only necessary to be connected to the air flow path on the downstream side of the diffuser passage 15. For example, the bypass passage 50 can also be configured so as to be connected to an intake manifold which connects the discharge scroll chamber 12 and the internal combustion engine to bypass a part of compressed air from the intake manifold to the air tank part 41.

The turbocharger 1 can prevent the adhesion of a deposit in the diffuser passage 15 as described above.

Example 2

Figure 7:
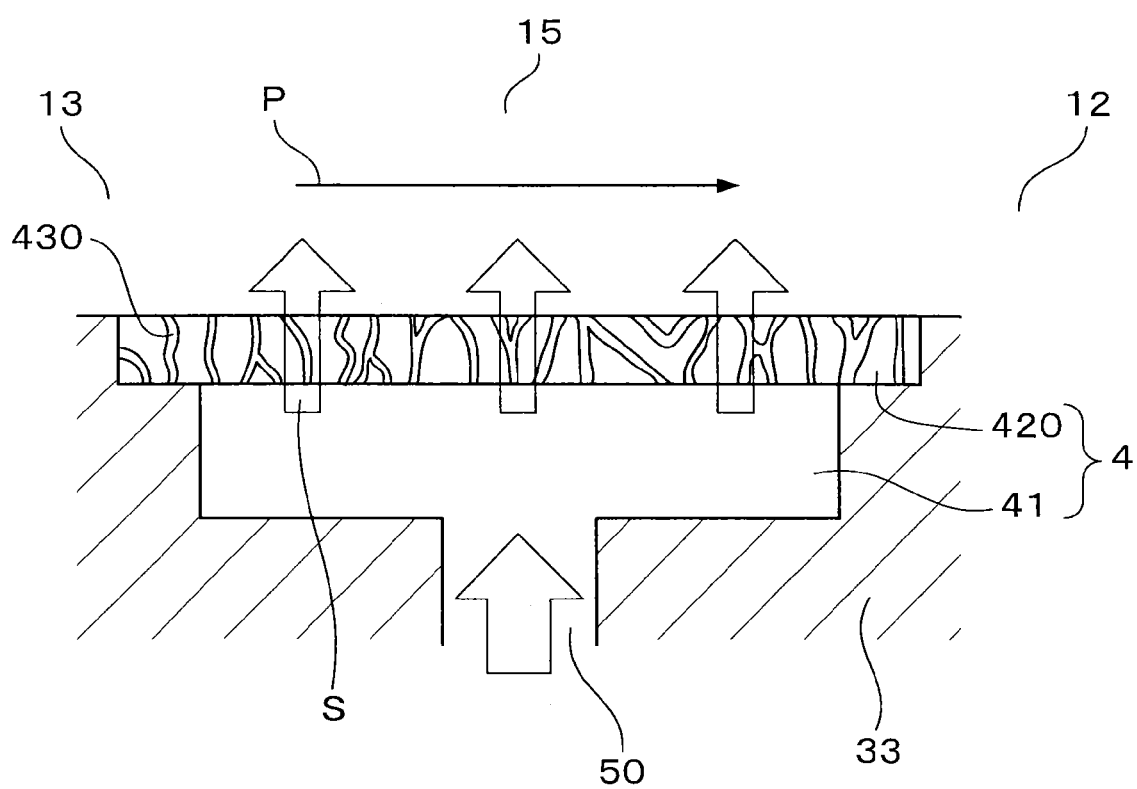
FIG. 7 This is an enlarged cross-sectional explanatory view showing an adhesion preventing part having a surface forming part made of a porous body in Example 2.

A turbocharger 1 of Example 2 includes a surface forming part 420 made of a porous body as shown in FIG. 7, in place of the surface forming part 42 made of a metallic plate in Example 1. In the meantime, the same reference numerals are added to the components and the like equivalent to those of the turbocharger 1 of Example 1, and the explanations thereof are omitted.

The surface forming part 420 has many fine through holes 430 as shown in FIG. 7. In the surface forming part 420, the direction where the respective through holes 430 are formed is irregular. Therefore, the respective through holes 430 are formed neither in the predetermined direction Q nor along the virtual curve C, unlike the surface forming part 42 in Example 1. Also in the surface forming part 420 having such through holes 430, compressed air flows in the P direction through the diffuser passage 15, thereby causing ejector effect, so that compressed air within the air tank part 41 spouts out from the through holes 430 as shown by the arrow S in FIG. 7, thereby making it possible to prevent the adhesion of a deposit in the diffuser passage 15. Further, since the surface forming part 420 is made of a porous resin, the through holes 430 can be easily formed, thereby making it possible to form the surface forming part 420 inexpensively.

Similar function and effect similar to those in Example 1 are obtained also in this example, except those obtained by features that the through holes 43 are formed in the predetermined direction Q and that the through holes 43 are formed along the virtual curve C.

The invention claimed is:

1. A turbocharger comprising:
a compressor housing having internally an air flow path in which an impeller is arranged, and
a bearing housing rotatably supporting a rotor shaft on one end of which the impeller is fixed,
wherein the air flow path has an air intake port to suck air toward the impeller and a discharge scroll chamber formed in a circumferential direction on an outer circumferential side of the impeller to guide compressed air discharged from the impeller to an outside;
the compressor housing has a shroud surface opposite to the impeller and a diffuser surface extending from the shroud surface toward the discharge scroll chamber;
the bearing housing has an opposite surface facing the diffuser surface of the compressor housing to form a diffuser passage between the opposite surface and the diffuser surface;
an adhesion preventing part to prevent an adhesion of a deposit is provided on at least one of the diffuser surface of the compressor housing and the opposite surface of the bearing housing;
the adhesion preventing part has a surface forming part having a plurality of fine through holes which open to a side of the diffuser passage and an air tank part covered with the surface forming part from the side of the diffuser passage and configured so as to be in communication with the air flow path on a downstream side of the diffuser passage so that a part of compressed air is supplied; and
the turbocharger is configured so that compressed air supplied to the air tank part spouts out to the diffuser passage through the through holes by an ejector effect caused when compressed air passes through the diffuser passage,
wherein the through holes are formed along a virtual curve in the diffuser passage, the virtual curve being curved in such a manner that the closer the curve comes to the downstream side of the diffuser passage from a starting point, the more distant the curve is in a direction opposite to a rotating direction of the impeller, with respect to a virtual straight line passing the starting point that an angle formed with a tangent line at an outer edge of the impeller from the starting point coincides with a backward angle of the impeller.

2. The turbocharger according to claim 1, wherein each of the fine through holes is formed so that a hole forming direction directed from an opening part on a side of the air tank part to an opening part on the side of the diffuser passage is inclined to the downstream side of the diffuser passage.

3. A turbocharger comprising:
a compressor housing having internally an air flow path in which an impeller is arranged; and
a bearing housing rotatably supporting a rotor shaft on one end of which the impeller is fixed,
wherein the air flow path has an air intake port to suck air toward the impeller and a discharge scroll chamber formed in a circumferential direction on an outer circumferential side of the impeller to guide compressed air discharged from the impeller to an outside;
the compressor housing has a shroud surface opposite to the impeller and a diffuser surface extending from the shroud surface toward the discharge scroll chamber;
the bearing housing has an opposite surface facing the diffuser surface of the compressor housing to form a diffuser passage between the opposite surface and the diffuser surface;
an adhesion preventing part to prevent an adhesion of a deposit is provided on at least one of the diffuser surface of the compressor housing and the opposite surface of the bearing housing;
the adhesion preventing part has a surface forming part having a plurality of fine through holes which open to a side of the diffuser passage and an air tank part covered with the surface forming part from the side of the diffuser passage and configured so as to be in communication with the air flow path on a downstream side of the diffuser passage so that a part of compressed air is supplied; and
the turbocharger is configured so that compressed air supplied to the air tank part spouts out to the diffuser passage through the through holes by an ejector effect caused when compressed air passes through the diffuser passage, and
the turbocharger further includes a bypass passage that is connected to the air flow path on the downstream side of an outlet port discharging compressed air guided by the discharge scroll chamber, and configured so that compressed air is supplied to the air tank part via the bypass passage.

4. The turbocharger according to claim 3, wherein an air flowing port of the bypass passage in a connection part of the bypass passage and the air flow path opens in a direction where compressed air flows in the air flow path on the downstream side of the outlet port.

5. A turbocharger comprising:
a compressor housing having internally an air flow path in which an impeller is arranged, and
a bearing housing rotatably supporting a rotor shaft on one end of which the impeller is fixed,
wherein the air flow path has an air intake port to suck air toward the impeller and a discharge scroll chamber formed in a circumferential direction on an outer circumferential side of the impeller to guide compressed air discharged from the impeller to an outside;
the compressor housing has a shroud surface opposite to the impeller and a diffuser surface extending from the shroud surface toward the discharge scroll chamber;
the bearing housing has an opposite surface facing the diffuser surface of the compressor housing to form a diffuser passage between the opposite surface and the diffuser surface;
an adhesion preventing part to prevent an adhesion of a deposit is provided on at least one of the diffuser surface of the compressor housing and the opposite surface of the bearing housing;

the adhesion preventing part has a surface forming part having a plurality of fine through holes which open to a side of the diffuser passage and an air tank part covered with the surface forming part from the side of the diffuser passage and configured so as to be in communication with the air flow path on a downstream side of the diffuser passage so that a part of compressed air is supplied; and the turbocharger is configured so that compressed air supplied to the air tank part spouts out to the diffuser passage through the through holes by an ejector effect caused when compressed air passes through the diffuser passage, and the adhesion preventing part is provided both on the diffuser surface of the compressor housing and on the opposite surface of the bearing housing.

\* \* \* \* \*